United States Patent
Zhou et al.

(10) Patent No.: US 12,539,817 B2
(45) Date of Patent: Feb. 3, 2026

(54) BACK MOUNTED MOVABLE STORAGE CHEST

(71) Applicant: A&C FUTURE, INC., Newport Beach, CA (US)

(72) Inventors: Zhuangboyu Zhou, Santa Ana, CA (US); Ju Gao, Newport Beach, CA (US); Jiuqi Wang, Santa Ana, CA (US); Sichen Li, Santa Ana, CA (US); Xunmin Jiang, Irvine, CA (US); Shoue Chen, Irvine, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 432 days.

(21) Appl. No.: 18/168,487

(22) Filed: Feb. 13, 2023

(65) Prior Publication Data

US 2024/0270177 A1    Aug. 15, 2024

(51) Int. Cl.
  *B60R 9/06* (2006.01)
(52) U.S. Cl.
  CPC .................................. *B60R 9/065* (2013.01)
(58) Field of Classification Search
  CPC .................................................. B60R 9/00–08
  See application file for complete search history.

(56) References Cited

U.S. PATENT DOCUMENTS

| | | | |
|---|---|---|---|
| 4,681,361 A | 7/1987 | Jolley et al. | |
| 6,105,843 A * | 8/2000 | Dollesin | B60R 9/065 |
| | | | 224/524 |
| 6,655,895 B1 * | 12/2003 | Dahl | B60R 9/10 |
| | | | 224/525 |
| 6,845,895 B2 | 1/2005 | Jones et al. | |
| 10,112,546 B1 | 10/2018 | Hall | |
| 2002/0148870 A1 * | 10/2002 | Zimmerman | B60R 9/06 |
| | | | 224/508 |
| 2009/0028679 A1 * | 1/2009 | Smith | B60P 1/4421 |
| | | | 414/800 |
| 2012/0292357 A1 | 11/2012 | Tennyson et al. | |
| 2017/0341556 A1 * | 11/2017 | Peles | B60R 9/065 |
| 2018/0244209 A1 * | 8/2018 | Hebel | B60R 9/06 |
| 2021/0031665 A1 | 2/2021 | Niemela et al. | |
| 2022/0379816 A1 | 12/2022 | Dunn | |
| 2023/0166664 A1 * | 6/2023 | Williams | B60R 9/065 |
| | | | 224/519 |

FOREIGN PATENT DOCUMENTS

DE    102013014865 A1 *   3/2015   ............. B60R 9/065

* cited by examiner

*Primary Examiner* — Jacob S. Scott
(74) *Attorney, Agent, or Firm* — INNOVATION CAPITAL LAW GROUP, LLP; Vic Lin

(57) ABSTRACT

A detachable storage space, such as a movable closet, can be mounted on the back of a vehicle, such as a recreational vehicle. The detachable storage space differs from a trailer, which can lead to a worse driving experience. When the detachable storage space is mounted on the vehicle, it will be similar to a spare tire mounted on a back of a sport-utility vehicle, for example. A lifting structure on the backside of the vehicle can lift the detachable storage space and lock it on the vehicle structure. The detachable storage space can include wheels and a small motor to permit users to move and control it remotely.

20 Claims, 8 Drawing Sheets

BACK MOUNTED MOVABLE STORAGE CHEST

BACKGROUND OF THE INVENTION

1. Field of the Invention

Embodiments of the invention relate generally to storable and movable furniture. More particularly, embodiments of the invention relate to a storage assembly that can be mounted on a back side of a vehicle, removed therefrom and moved to a desired location away from the vehicle.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Most travelers have terrible experience with the small storage space of their vehicle. Even for most recreational vehicles, there are not enough space for storage. This is often due to the restriction of the vehicle dimensions for highway travel.

In view of the foregoing, there is a need for a storage solution that can be moved with a vehicle without taking up floor space within the vehicle and without increasing a width of the vehicle.

SUMMARY OF THE INVENTION

Embodiments of the present invention aim to solve the aforementioned problems in conventional storage space by providing a detachable storage space on a back side of a vehicle, such as a recreational vehicle (RV) that does not require a trailer and, thus, does not adversely affect operation of the vehicle.

Embodiments of the present invention provide a detachable storage structure comprising a storage cabinet; a frame attached to and movable along a back wall of a vehicle, the storage cabinet removably fixable to the frame; and a lift mechanism for raising and lowering the frame, wherein when the storage cabinet is fixed to the frame, the storage cabinet is movable between a raised position, with the storage cabinet is raised off a ground surface, and a lowered position, with the storage cabinet resting on the ground surface.

Embodiments of the present invention provide a detachable storage structure comprising a storage cabinet; a frame attached to and movable along a back wall of a vehicle, the storage cabinet removably fixable to the frame; a gearbox attached to the frame; a gear operable to turn in the gearbox; a shaft extending through the gearbox, the shaft having teeth engaging with the gear, where turning the gear causes the gearbox to move along the shaft, where, when the storage cabinet is fixed to the frame, the storage cabinet and the frame are movable between a raised position, with the storage cabinet is raised off a ground surface, and a lowered position, with the storage cabinet resting on the ground surface; wheels on a bottom of the storage cabinet; and a motor operable to drive the wheels to position the storage cabinet at a desired location after the lift mechanism positions the storage cabinet in the lowered position.

Embodiments of the present invention provide a detachable storage structure comprising a storage cabinet; a frame attached to and movable along a back wall of a vehicle, the storage cabinet removably fixable to the frame; a fork extending outward from the frame; a fork receptacle disposed as an opening in the back side of the storage cabinet; one or more hooks extending outward from the frame; one or more eyes fixed to the storage cabinet, the one or more hooks removably attaching to the one or more eyes when the storage cabinet is disposed on the frame; a gearbox attached to the frame; a gear operable to turn in the gearbox; a shaft extending through the gearbox, the shaft having teeth engaging with the gear, where turning the gear causes the gearbox to move along the shaft, where, when the storage cabinet is fixed to the frame, the storage cabinet and the frame are movable between a raised position, with the storage cabinet is raised off a ground surface, and a lowered position, with the storage cabinet resting on the ground surface; wheels on a bottom of the storage cabinet; and a motor operable to drive the wheels to position the storage cabinet at a desired location after the lift mechanism positions the storage cabinet in the lowered position.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
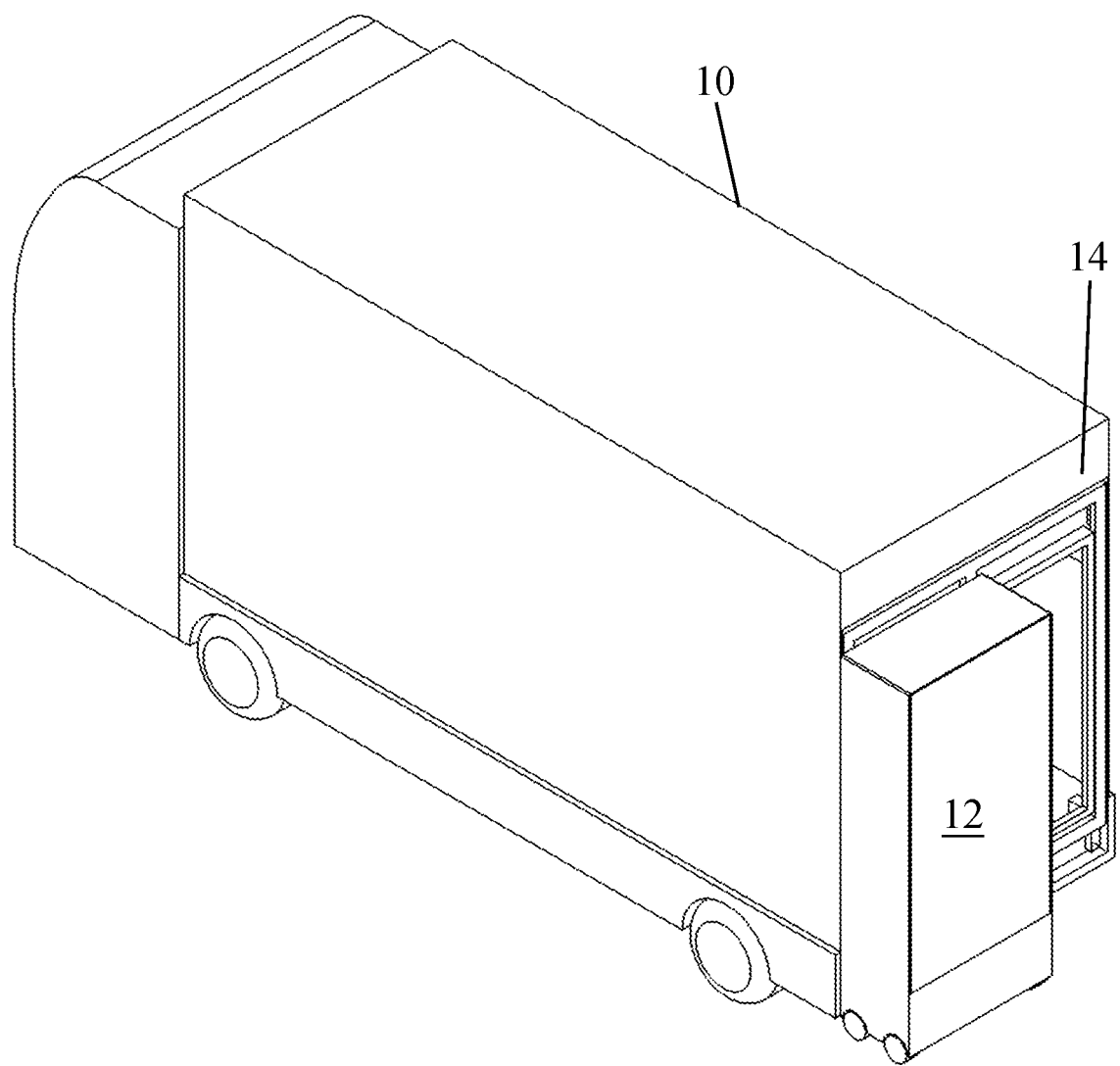
FIG. 1 illustrates a perspective view of a vehicle having a detachable storage space provided on a back side thereof, according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a detachable storage space, such as a movable closet, which can be mounted on the back of a vehicle, such as a recreational vehicle. The detachable storage space differs from a trailer, which can lead to a worse driving experience. When the detachable storage space is mounted on the vehicle, it will be similar to a spare tire mounted on a back of a sport-utility vehicle, for example. A lifting structure on the backside of the vehicle can lift the detachable storage space and lock it on the vehicle structure. The detachable storage space can include wheels and a small motor to permit users to move and control it remotely.

The figures are briefly described below, followed by a broader discussion of each figure and the components therein.

As used herein the terms horizontally and vertically may refer to directions that are generally vertical and horizontal, but not necessarily perfectly so. For example, when mounted on a vehicle, if the vehicle is on a slope, horizontal and vertical movements may be considered as being offset by such a slope.

FIG. 1 offers an overview of the back mounted movable storage closet attached to an RV. The closet is raised and mounted at the back side while the vehicle is moving. In some embodiments, its width can be narrower than the back wall to leave space for a door which may become the entrance of the vehicle. If there is no need for this space, the closet can be made larger and cover more or all of the back side of the vehicle.

Figure 2:
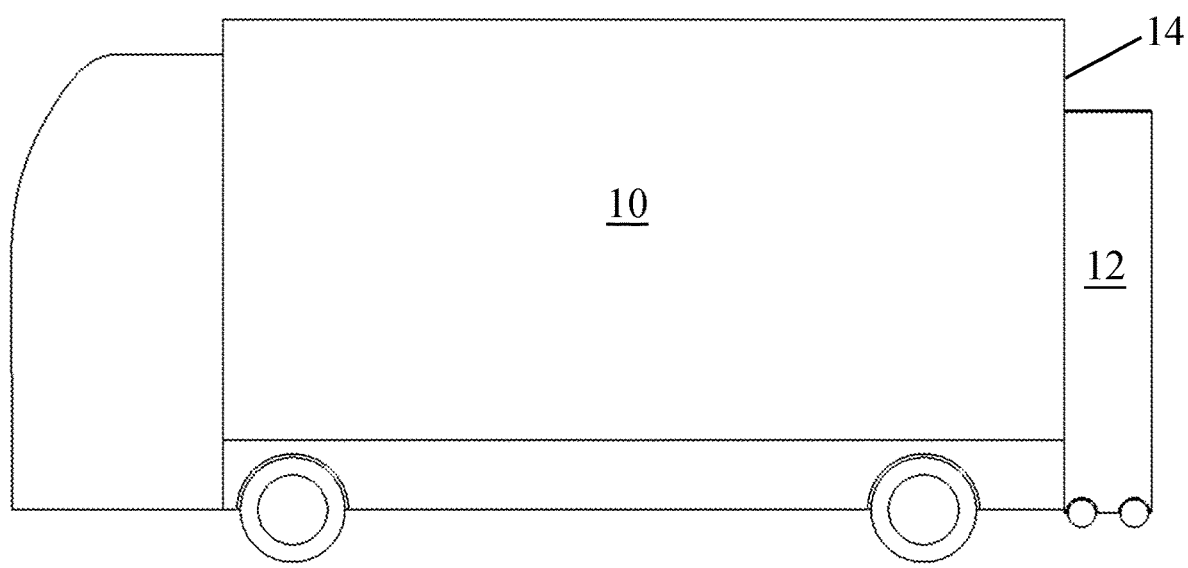
FIG. 2 illustrates a side view of the vehicle of FIG. 1 with the detachable storage space in a stowed/raised position.

FIG. 2 is the side view of the vehicle with the closet. After the closet has been locked with the vehicle, it can be lifted by a fork mechanism. Such a design allows people to drive the vehicle without towing anything.

Figure 3:
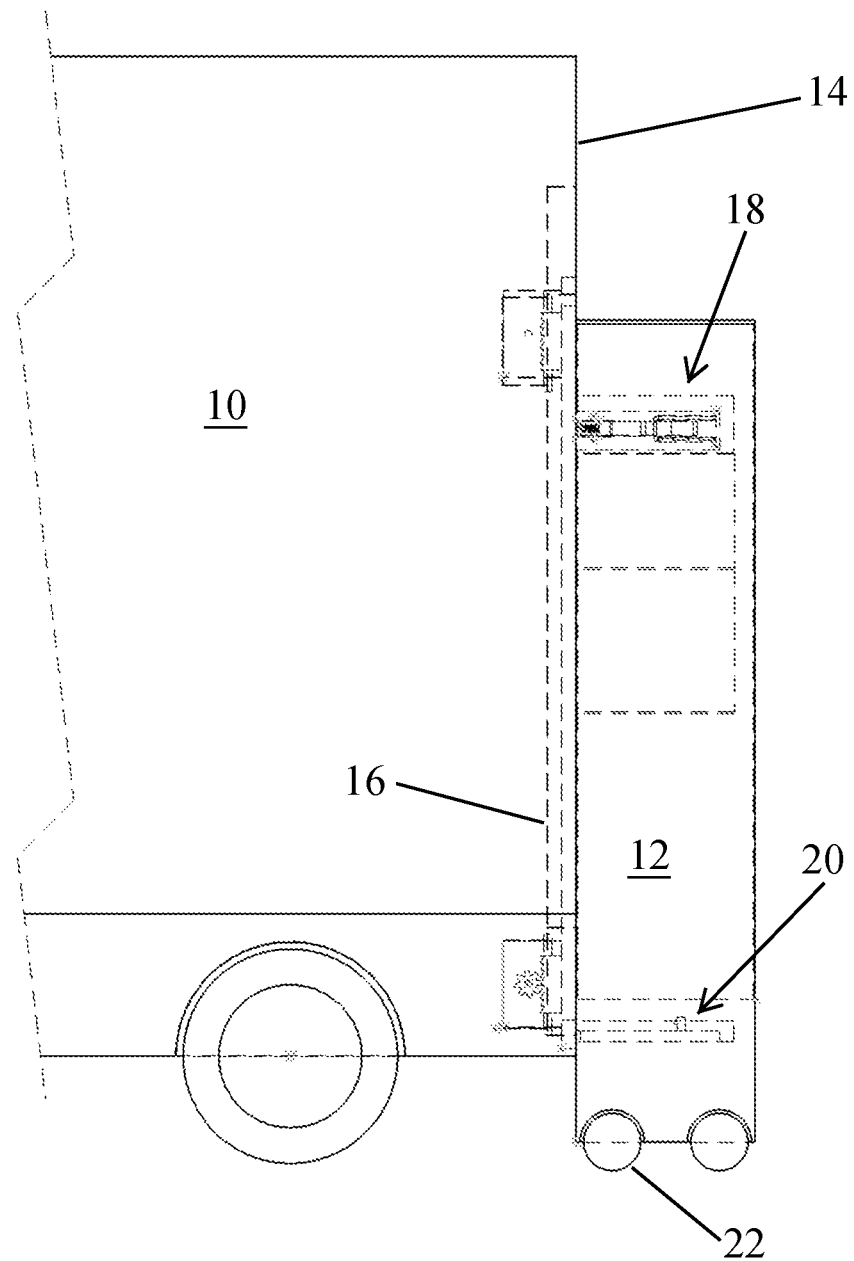
FIG. 3 illustrates a detailed side view of the vehicle of FIG. 1 with the detachable storage space in a lowered position.

FIG. 3 illustrates the inner structure of the attachment between the closet and the vehicle. Two hooks can be disposed inside the closet, located on the back side. The hooks can be used to fix the closet on the vehicle. A slot can be disposed near the bottom of the closet. The slot can fit the hook on the vehicle. The slot can provide a space similar to a forklift mechanism.

Figure 4:
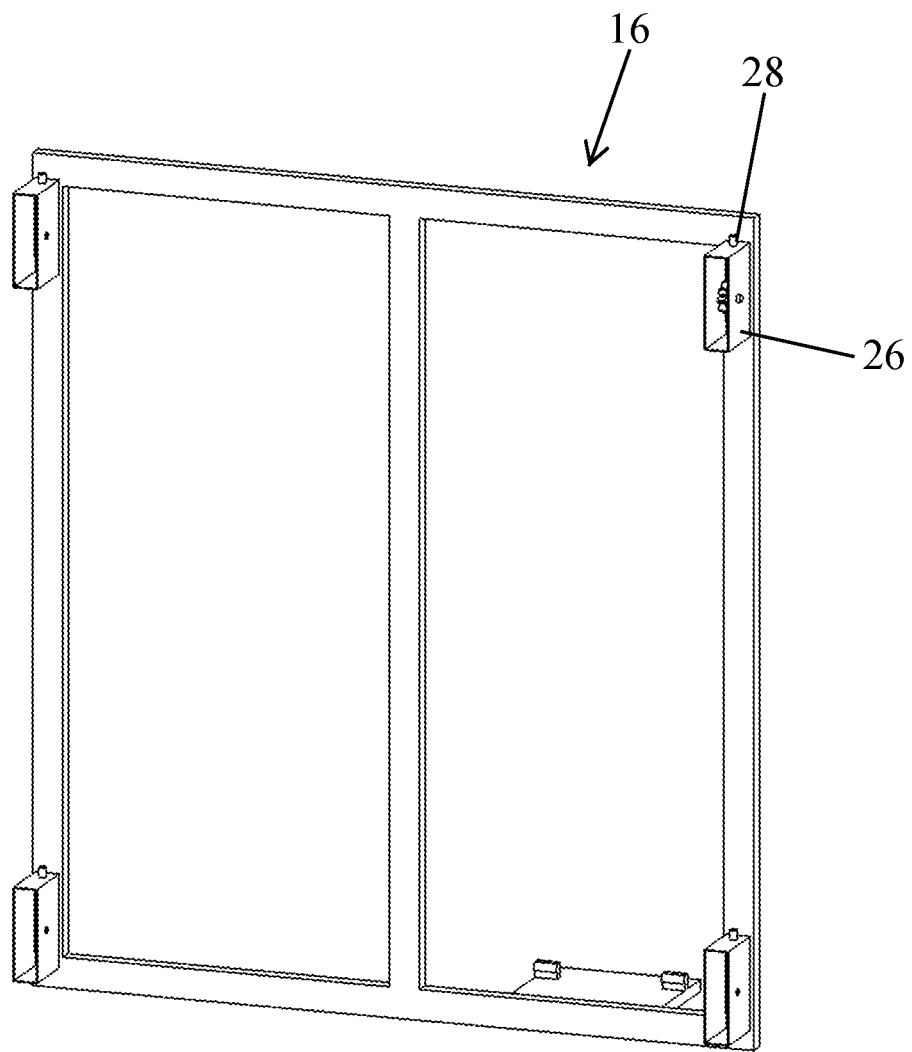
FIG. 4 illustrates a back perspective view of a frame movable along a back side of the vehicle to move the detachable storage space between the raised and lowered positions.

As shown in FIG. 4, the lifting frame can include four shafts. Each shaft is concentric with a hole in the gear box on the vehicle. The frame can slide along the slots on the backside surface of the vehicle.

Figure 5:
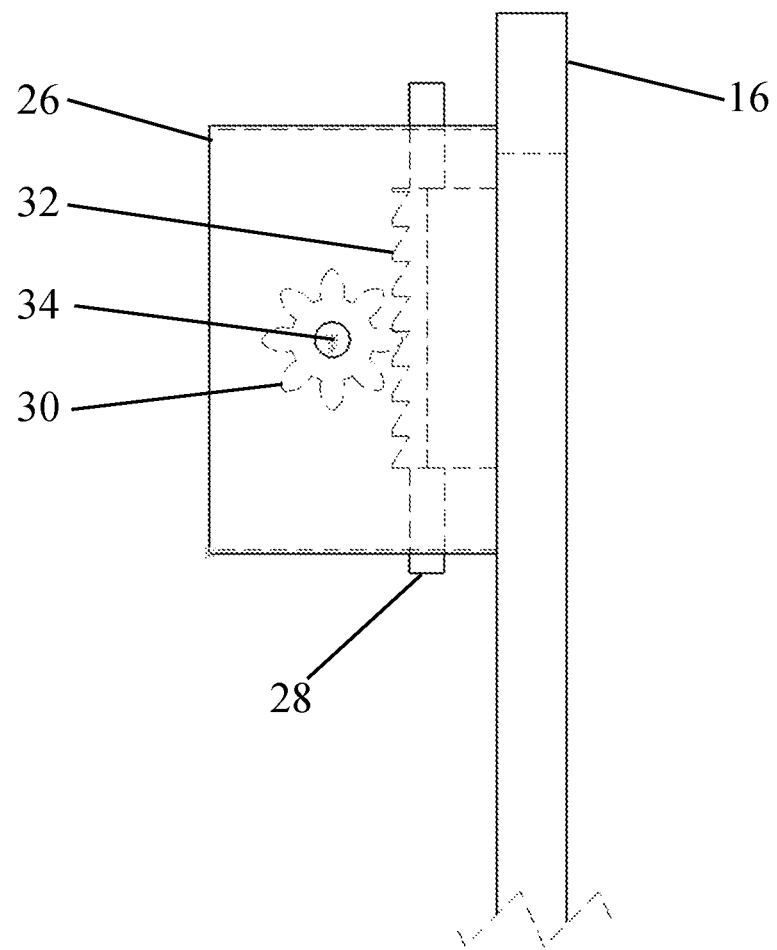
FIG. 5 illustrates a detailed side view of the frame, showing the gear and drive rod for moving the frame.

FIG. 5 illustrates how people can control the forklift with the gear box. There are threads set on the shaft. The gear can drive the shaft to move vertically. The four shafts can drive the frame to move along the slots which finally brings the closet up and down.

Figure 6:
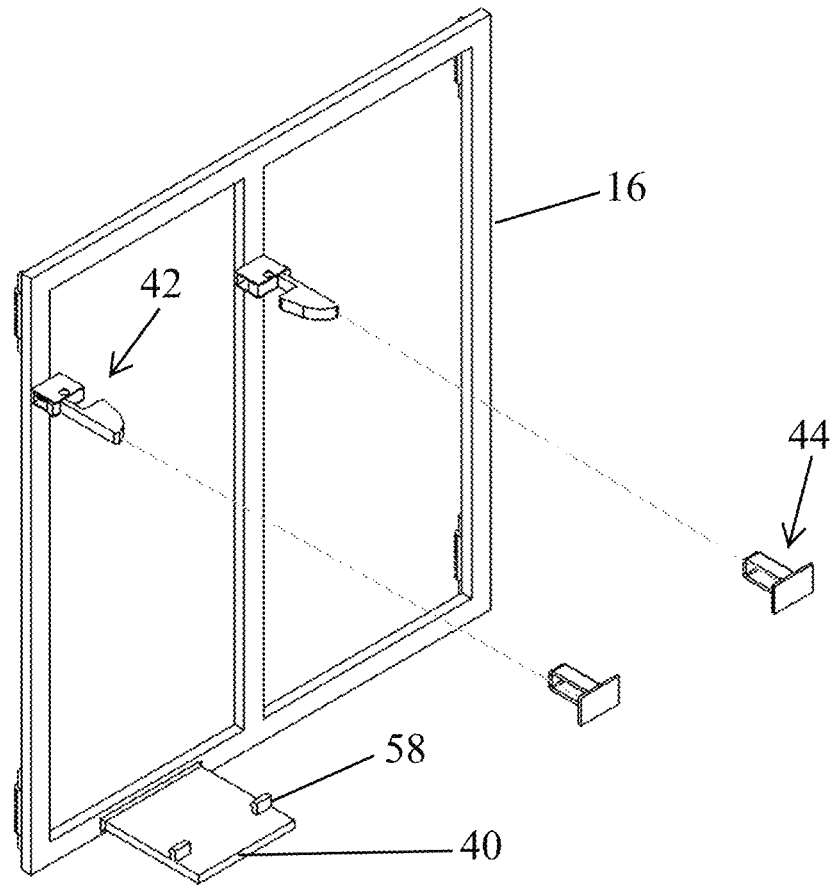
FIG. 6 illustrates a front perspective view of the frame of FIG. 4, illustrating how a ring portion of the detachable storage space interacts with resiliently movable hooks of the frame.
Figure 7:
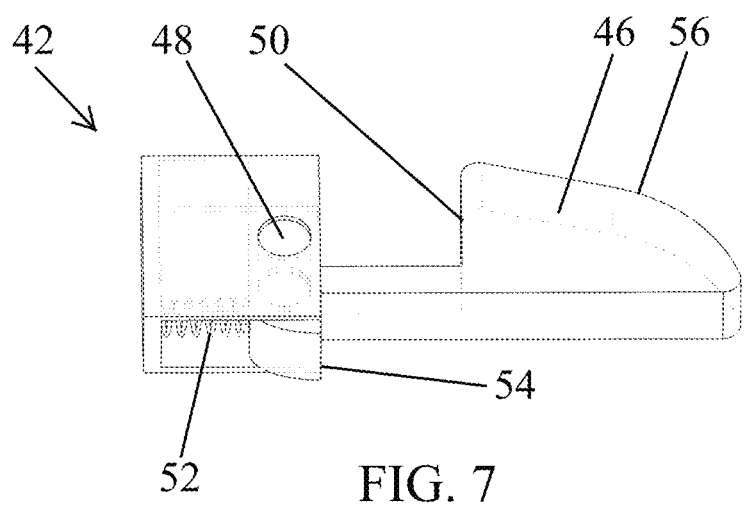
FIG. 7 illustrates a detailed perspective view of the hook of FIG. 6.

FIG. 6 illustrates how the closet is fixed on the frame. When the closet has been set to align with the forklift, each hook can also be aligned to match with a ring inside the closet. Two hooks on the forklift can help to keep the closet on the fork. When the closet is tightly touching the lift frame, the hooks can lock with the ring to secure the closet to the vehicle. As shown in FIG. 7, the hook can be rotatable horizontally and can be resiliently urged in a straight position by a spring, for example. The spring keep the hook straight unless the ring pushes it to one side during insertion of the closet on the frame. Then the spring will push back the hook when it has matched the hollow part of the ring.

Figure 8:
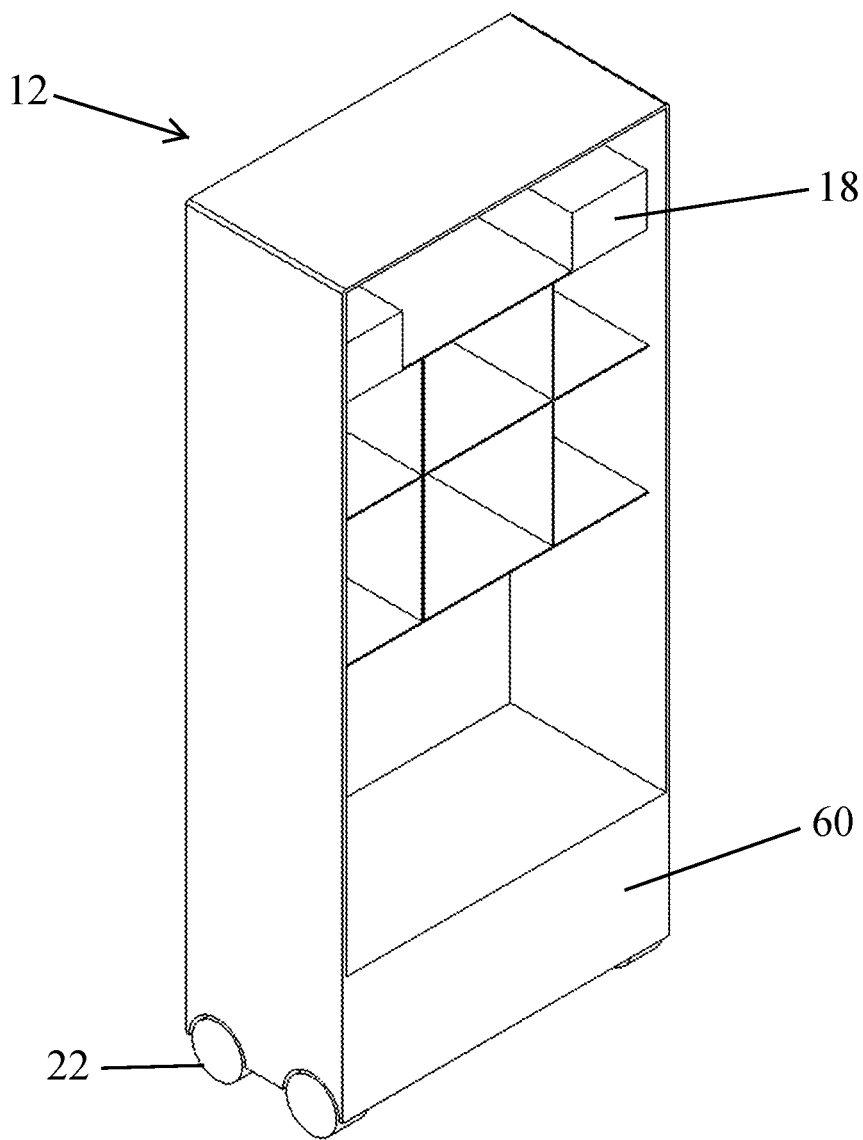
FIG. 8 illustrates a front view of the detachable storage space of FIG. 1.
Figure 9:
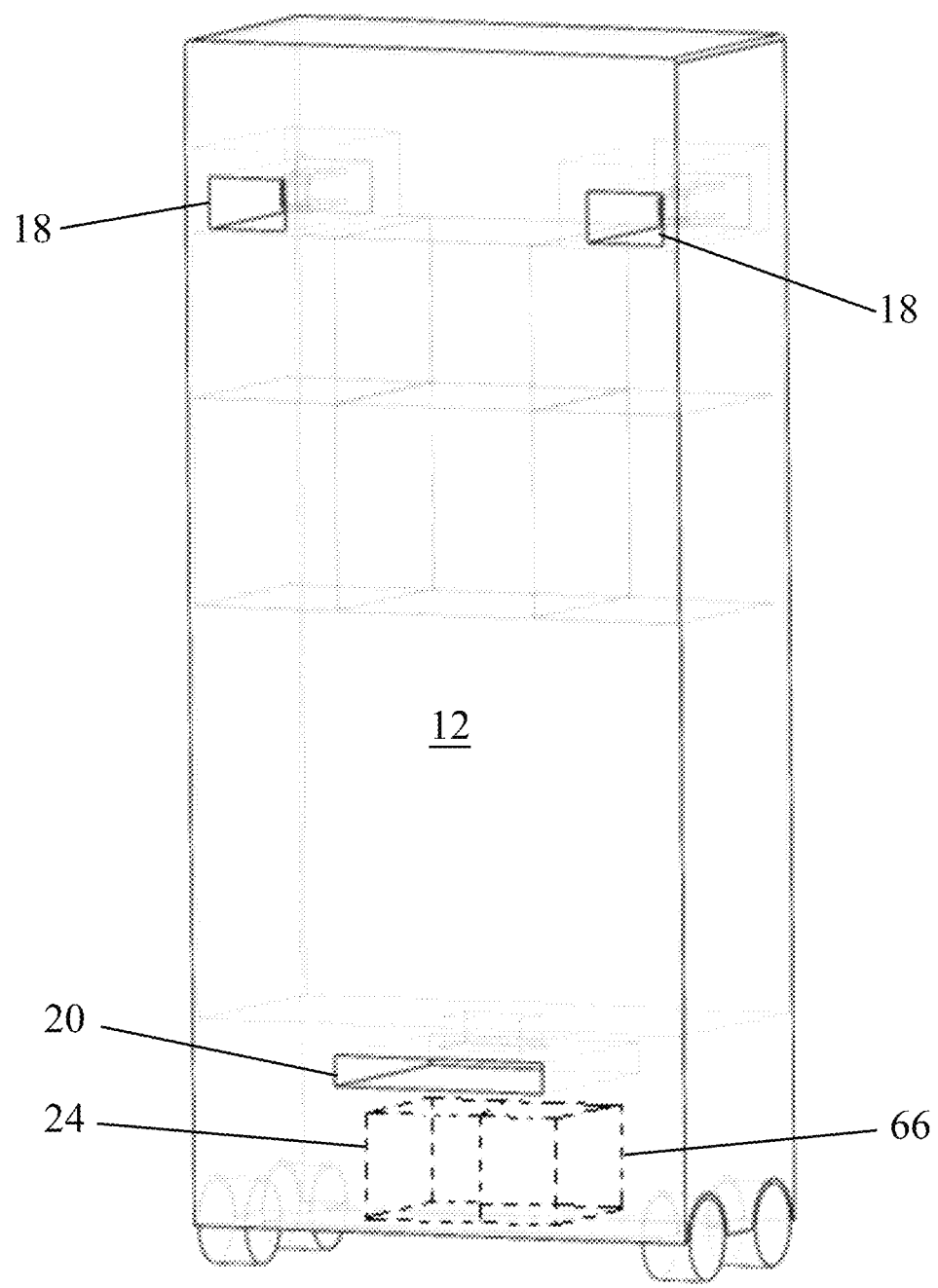
FIG. 9 illustrates a back view of the detachable storage space of FIG. 8.

FIG. 8 shows the front side of the closet. The inner structure looks like a regular closet. Two pairs of wheels and a simple electric motor can be disposed at the bottom of the closet. This design is to permit the closet to be user-controllable, and it allow the user to move the closet to anywhere as needed. As shown in FIG. 9, the closet can include three locations for fixing the closet to the vehicle, which includes a slot for the forklift and two slots for the hook and ring assemblies.

Referring back to FIGS. 1 through 3, a vehicle 10, such as a recreational vehicle, can include a back wall 14 upon which a storage cabinet 12 may be mounted. The storage cabinet 12 can take different forms, such as a closet, a set of shelves, a large trunk-like space, or the like, and combinations thereof. The storage cabinet 12 can include one or more locking chambers 18, described below, and one or more fork receptacles 20, also described below.

A frame 16 may be formed in or mounted on the back wall 14 of the vehicle 10. The frame 16 can be used, as described below, to raise and lower the storage cabinet 12 and to lock the storage cabinet 12 onto the back wall 14 of the vehicle 10.

Referring now to FIGS. 4 and 5, the frame 16 can include a gear box 26 with a shaft 28 passing therethrough. The shaft 28 may be fixed to the vehicle 10 so that the gear box 26 can move along the shaft 28 to raise and lower the frame 16. The gear box 26 can include a gear 30 that may rotate about a gear axis 34, where the gear 30 can interact with teeth 32 of threads on the shaft 28. Thus, as the gear 30 is driven to rotate about the gear axis 34, the frame 16 can be raised and lowered as the gear 30 moves. The gear 30 may be turned by a device built into the vehicle, or may be driven by a drive motor (not shown) on the frame 16. In some embodiments, a single drive motor may drive both gears 30 simultaneously. Where the frame 16 is an add-on device for a vehicle, the frame 16 may include a built in drive motor to drive the gears 30, where the frame needs only to be connected to a power source, such as a vehicle battery (not shown).

Referring also to FIGS. 6 and 7, the front of the frame 16 can include one or more hooks 42, typically two of more hooks 42 that can interact with eyes 44 fixed to the storage cabinet 12. The eyes 44 may be disposed, for example, within the locking chambers 18, where, as the storage cabinet 12 is moved toward to frame 16, the hooks 42 can also move into the locking chambers 18 to engage with the eyes 44.

The hooks 42 can include a movable hooking element 46 that can pivot on a hook axis 48. The hook 42 may be resiliently urged in a straight position (as shown in FIG. 7) so that a lip 50 of the hooking element 46 is generally parallel with the back wall 14 of the vehicle 10 (see FIGS. 1 through 3). The hook 42 can include a spring 52, for example, that can urge the hooking element 46 in the straight position. The hooking element 46 can include a curved surface 56 that runs along one side of the hooking element 46, from its distal end toward the lip 50. When the eye 44 is pushed onto the hook 42, the eye 44 can push the hooking element 46 to bend outward (downward and out of the page in the view of FIG. 7) to permit the eye 44 to move to rest against the lip 50 with the hooking element 46 moved back toward the straight position. Thus, the storage cabinet 12 may be retained by the action of the eye 44 being retained by the lip 50 of the hooking element 46 of the hook 42. A base of the hook 42 may be fixed to the frame 16, as shown in FIG. 6. A fork 40 may be attached to the frame 16 at a lower portion thereof. The fork 40 may fit into the fork receptacle 20 formed in the back of the storage cabinet 10 (see FIG. 9). The fork 40 may further include upward extending protrusions 58 which may fit into a slot (not shown) formed in a top side of the fork receptacle 20 to further secure the storage cabinet 12 to the frame 16. The upward extending protrusion 58 may help prevent the storage cabinet 12 from sliding outward, away from the back wall 14 of the vehicle 12 when the storage cabinet 12 is disposed on the fork 40.

A protrusion 54 may be disposed on the hook 42 in such a way that depressing the protrusion 54 can cause the hooking element 46 to pivot, thereby releasing the eye 44 from the lip 50 of the hooking element 46. This protrusion 54 may be mechanically actuated by a motor or linear actuator formed in the storage cabinet 12, or the protrusion 54 may be user-activated. Further, other mechanisms may be provided to release the hooking element 46 from the eye 42 to release the storage cabinet 12 from the frame 16.

Referring to FIGS. 8 and 9, the storage cabinet 12 can include a base compartment 60 that can include a drive motor 24 that can drive wheels 22. The drive motor 24 may be controlled via a remote control or via buttons (not shown) on the storage cabinet 12. The drive motor 24 may be used to move the storage cabinet 12 to a desired location. The drive motor 24 may be powered by a battery 66 formed in the base 60 of the storage cabinet 12. In some embodiments, the battery 66 may be charged by an external power connection or may be charged when the storage cabinet 12 is disposed on the frame 16 by, for example, power connectors (not shown) provided between the frame 16 and the storage cabinet 12. While FIG. 8 shows an interior space of the cabinet being open, it should be understood that a door may be disposed to keep items within the cabinet while the vehicle is in motion.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A detachable storage structure comprising:
a storage cabinet;
a frame attached to and movable along a back wall of a vehicle, the storage cabinet removably fixable to the frame; and
a lift mechanism for raising and lowering the frame, wherein when the storage cabinet is fixed to the frame, the storage cabinet is movable between a raised position, with the storage cabinet is raised off a ground surface, and a lowered position, with the storage cabinet resting on the ground surface.

2. The detachable storage structure of claim 1, further comprising:
wheels on a bottom of the storage cabinet; and
a motor operable to drive the wheels to position the storage cabinet at a desired location after the lift mechanism positions the storage cabinet in the lowered position.

3. The detachable storage structure of claim 1, further comprising:
a fork extending outward from the frame; and
a fork receptacle disposed as an opening in the back side of the storage cabinet, wherein
the fork fits into the fork receptacle to permit raising of the storage cabinet and the frame by the lift mechanism.

4. The detachable storage structure of claim 3, further comprising one or more upward extending protrusions extending upward from a top surface of the fork, the one or more upward extending protrusions operable to prevent sliding of the storage cabinet along the fork.

5. The detachable storage structure of claim 1, further comprising:
one or more hooks extending outward from the frame; and
one or more eyes fixed to the storage cabinet, the one or more hooks removably attaching to the one or more eyes when the storage cabinet is disposed on the frame.

6. The detachable storage structure of claim 5, further comprising one or more hook receptacles formed as openings in a back side of the storage cabinet, the one or more hook receptacles holding respective ones of the one or more eyes.

7. The detachable storage structure of claim 5, wherein the one or more hooks include a hook member resiliently urged in a straight position, the hook member pivotably movable to permit the one or more eyes to engage with or disengage from the one or more eyes.

8. The detachable storage structure of claim 7, wherein the hook member include a lip, the lip engaging with one of the one or more eyes to prevent the storage cabinet from being removed from the frame when the storage cabinet is disposed on the frame.

9. The detachable storage structure of claim 5, wherein the hook member includes a protrusion, where depressing the protrusion pivots the hook member away from engagement with one of the one or more eyes.

10. The detachable storage structure of claim 1, wherein the lifting mechanism includes a shaft having teeth on a least a portion of the shaft, the shaft fitting through a gear box housing a gear, the gear rotatable to engage with the shaft to permit movement of the gear box along the shaft, the gear box fixed to the frame.

11. A detachable storage structure comprising:
a storage cabinet;
a frame attached to and movable along a back wall of a vehicle, the storage cabinet removably fixable to the frame;
a gearbox attached to the frame;
a gear operable to turn in the gearbox;
a shaft extending through the gearbox, the shaft having teeth engaging with the gear, where turning the gear causes the gearbox to move along the shaft, where, when the storage cabinet is fixed to the frame, the storage cabinet and the frame are movable between a raised position, with the storage cabinet is raised off a ground surface, and a lowered position, with the storage cabinet resting on the ground surface;
wheels on a bottom of the storage cabinet; and
a motor operable to drive the wheels to position the storage cabinet at a desired location after the lift mechanism positions the storage cabinet in the lowered position.

12. The detachable storage structure of claim 11, further comprising:
a fork extending outward from the frame; and
a fork receptacle disposed as an opening in the back side of the storage cabinet, wherein
the fork fits into the fork receptacle to permit raising of the storage cabinet and the frame by the lift mechanism.

13. The detachable storage structure of claim 12, further comprising one or more upward extending protrusions extending upward from a top surface of the fork, the one or more upward extending protrusions operable to prevent sliding of the storage cabinet along the fork.

14. The detachable storage structure of claim 1, further comprising:
one or more hooks extending outward from the frame; and
one or more eyes fixed to the storage cabinet, the one or more hooks removably attaching to the one or more eyes when the storage cabinet is disposed on the frame.

15. The detachable storage structure of claim 14, further comprising one or more hook receptacles formed as openings in a back side of the storage cabinet, the one or more hook receptacles holding respective ones of the one or more eyes.

16. A detachable storage structure comprising:
a storage cabinet;
a frame attached to and movable along a back wall of a vehicle, the storage cabinet removably fixable to the frame;
a fork extending outward from the frame;
a fork receptacle disposed as an opening in the back side of the storage cabinet;
one or more hooks extending outward from the frame;
one or more eyes fixed to the storage cabinet, the one or more hooks removably attaching to the one or more eyes when the storage cabinet is disposed on the frame;
a gearbox attached to the frame;
a gear operable to turn in the gearbox;
a shaft extending through the gearbox, the shaft having teeth engaging with the gear, where turning the gear causes the gearbox to move along the shaft, where, when the storage cabinet is fixed to the frame, the storage cabinet and the frame are movable between a raised position, with the storage cabinet is raised off a ground surface, and a lowered position, with the storage cabinet resting on the ground surface;
wheels on a bottom of the storage cabinet; and
a motor operable to drive the wheels to position the storage cabinet at a desired location after the lift mechanism positions the storage cabinet in the lowered position.

17. The detachable storage structure of claim 16, further comprising one or more hook receptacles formed as openings in a back side of the storage cabinet, the one or more hook receptacles holding respective ones of the one or more eyes.

18. The detachable storage structure of claim 16, wherein the one or more hooks include a hook member resiliently urged in a straight position, the hook member pivotably movable to permit the one or more eyes to engage with or disengage from the one or more eyes.

19. The detachable storage structure of claim 18, wherein the hook member include a lip, the lip engaging with one of the one or more eyes to prevent the storage cabinet from being removed from the frame when the storage cabinet is disposed on the frame.

20. The detachable storage structure of claim 18, wherein the hook member includes a protrusion, where depressing the protrusion pivots the hook member away from engagement with one of the one or more eyes.

* * * * *